(12) United States Patent
Miller et al.

(10) Patent No.: US 8,892,755 B2
(45) Date of Patent: *Nov. 18, 2014

(54) SYSTEM AND METHOD FOR SINGLE SIGN-ON SESSION MANAGEMENT WITHOUT CENTRAL SERVER

(75) Inventors: Lawrence R. Miller, New York, NY (US); Bruce J. Skingle, Cambridge (GB)

(73) Assignee: JPMorgan Chase Bank, N.A., New York, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/082,713

(22) Filed: Apr. 8, 2011

(65) Prior Publication Data
US 2011/0185414 A1 Jul. 28, 2011

Related U.S. Application Data

(63) Continuation of application No. 10/078,687, filed on Feb. 19, 2002, now Pat. No. 7,941,533.

(51) Int. Cl.
*G06F 15/16* (2006.01)
*H04L 29/06* (2006.01)
*G06F 21/41* (2013.01)

(52) U.S. Cl.
CPC ...... *H04L 63/0815* (2013.01); *H04L 29/06027* (2013.01); *H04L 63/126* (2013.01); *G06F 21/41* (2013.01)
USPC .......................................... 709/229; 713/172

(58) Field of Classification Search
CPC .................. H04L 9/3281; H04L 29/08072
USPC ................ 709/203, 229; 713/180, 172
See application file for complete search history.

(56) References Cited

U.S. PATENT DOCUMENTS

| | | | |
|---|---|---|---|
| 5,999,971 A | 12/1999 | Buckland | |
| 6,421,768 B1 * | 7/2002 | Purpura | 711/164 |
| 6,490,624 B1 * | 12/2002 | Sampson et al. | 709/202 |
| 6,539,379 B1 | 3/2003 | Vora et al. | |
| 6,611,916 B1 | 8/2003 | Cacace-Bailey et al. | |
| 6,675,261 B2 | 1/2004 | Shandony | |
| 6,782,379 B2 | 8/2004 | Lee | |
| 6,816,871 B2 | 11/2004 | Lee | |
| 6,834,341 B1 | 12/2004 | Bahl et al. | |
| 7,080,077 B2 | 7/2006 | Ramamurthy et al. | |
| 7,137,006 B1 * | 11/2006 | Grandcolas et al. | 713/180 |
| 7,187,771 B1 | 3/2007 | Dickinson et al. | |
| 7,188,181 B1 * | 3/2007 | Squier et al. | 713/171 |

(Continued)

FOREIGN PATENT DOCUMENTS

| | | | | |
|---|---|---|---|---|
| EP | 0 940 960 A1 * | 9/1999 | | G06F 21/00 |
| WO | WO-02/05092 A2 | 1/2002 | | |

(Continued)

*Primary Examiner* — Ryan Zeender
*Assistant Examiner* — Hunter Wilder
(74) *Attorney, Agent, or Firm* — Goodwin Procter LLP

(57) ABSTRACT

A method and system for single-session sign-on management are provided. Multiple servers may be provided. The servers may have both log-in plug-in modules and session management plug-in modules. Providing the plug-ins on individual servers reduces network traffic generally required in order to grand a validate user credentials. Thus, a second server may validate a user credential created by a first server and may additionally create a user credential if it cannot validate the credential created by the first server.

20 Claims, 13 Drawing Sheets

(56) References Cited

U.S. PATENT DOCUMENTS

| | | |
|---|---|---|
| 7,350,229 B1 | 3/2008 | Lander |
| 7,743,404 B1 * | 6/2010 | Deutschmann et al. ...... 709/225 |
| 2003/0037131 A1 * | 2/2003 | Verma ........................... 709/223 |
| 2003/0115267 A1 * | 6/2003 | Hinton et al. ................. 709/204 |
| 2004/0139319 A1 | 7/2004 | Favazza et al. |
| 2005/0188212 A1 | 8/2005 | Laferriere et al. |

FOREIGN PATENT DOCUMENTS

| | | |
|---|---|---|
| WO | WO-02/05103 A1 | 1/2002 |
| WO | WO-02/05139 A1 | 1/2002 |
| WO | WO-02/05185 A1 | 1/2002 |
| WO | WO-02/05487 A1 | 1/2002 |
| WO | WO-02/05092 A3 | 4/2002 |
| WO | WO-02/052379 A2 | 7/2002 |
| WO | WO-02/052424 A1 | 7/2002 |
| WO | WO-02/052433 A1 | 7/2002 |
| WO | WO-02/052767 A2 | 7/2002 |
| WO | WO-02/056138 A2 | 7/2002 |
| WO | WO-02/056138 A3 | 10/2002 |
| WO | WO-02/077819 A1 | 10/2002 |
| WO | WO-03/001324 A2 | 1/2003 |
| WO | WO-02/052379 A3 | 2/2003 |
| WO | WO-02/052767 A3 | 2/2003 |
| WO | WO-03/001324 A3 | 4/2003 |
| WO | WO-2004/008307 A1 | 1/2004 |
| WO | WO-2004/008333 A1 | 1/2004 |

* cited by examiner

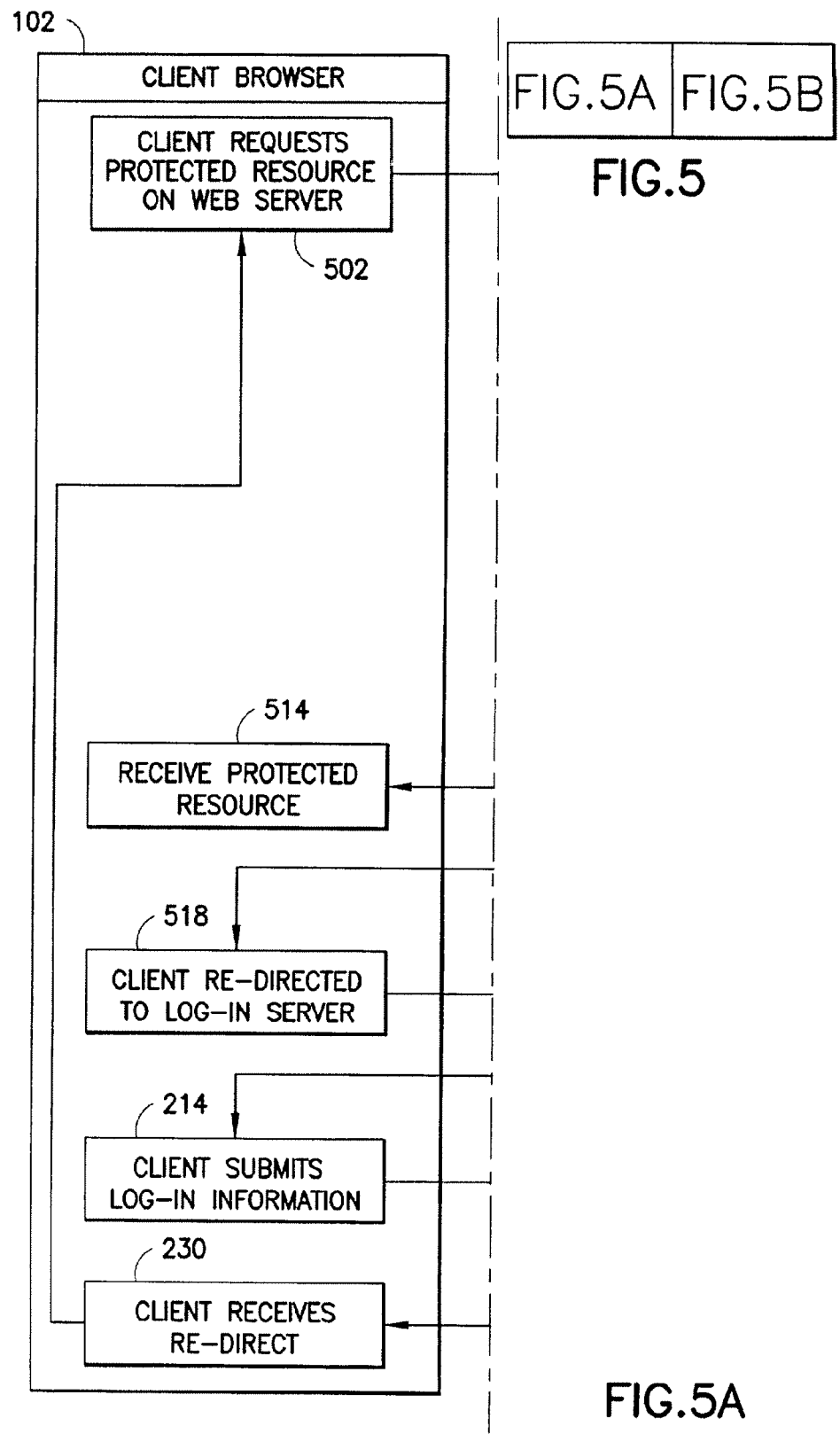

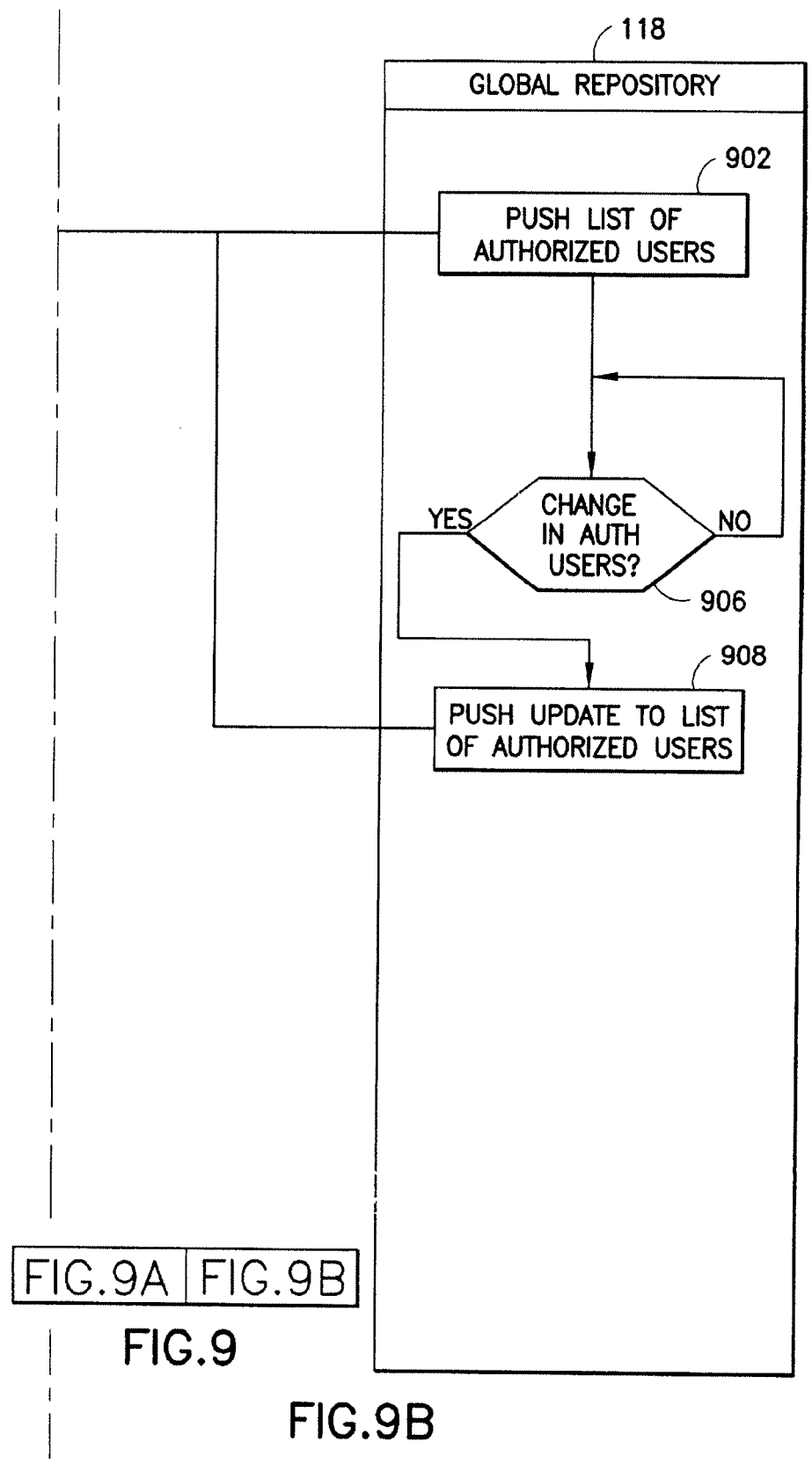

SYSTEM AND METHOD FOR SINGLE SIGN-ON SESSION MANAGEMENT WITHOUT CENTRAL SERVER

This patent application is a continuation of U.S. patent application Ser. No. 10/078,687, filed on Feb. 19, 2002, now U.S. Pat. No. 7,941,533, which is hereby incorporated by reference in its entirety.

BACKGROUND

1. Field of the Invention

The present invention relates to session management, and more particularly to single sign-on session management across multiple servers without requiring a central session management server.

2. Description of the Related Art

As known in the field of electronic information access, it is common for protected resources on a server to require some form of authentication or certification before the protected resources are provided to a client user. As an example, the client user at a computer with a browser application, such as INTERNET EXPLORER or NETSCAPE, connects to the server over the Internet and attempts to access, down-load or view a protected resource. Before allowing access to the protected resource, the server must verify that the client user is allowed access to the protected resource. This may take the form of validating the user's credentials against a list of authorized users through a log-in process. Once the user is authenticated through the log-in process, the user is granted credentials and a session between the client and the server is established. It is common for a client user to want access to protected resources on multiple servers. Unless there is some form of sharing or communication between the servers, the client user must log-in to each of the servers. This is not particularly advantageous, and to overcome these disadvantages, single sign-on session management servers have been developed and fielded. Examples of these types of session management systems are the system provided by ENTRUST, of Plano Tex., called GETACCESS, and the system provided by NETEGRITY of Waltham Mass., called NETEGRITY SITEMINDER. It is common with these types of single sign-on session management systems to use a central session management server, connected to the protected resource servers. In some configurations, central session management is hosted on a single server. In other configurations, a number of servers host the central session management, with the individual servers inter-connected and acting as a single logical server. A single logical server requires an exchange of information between the individual servers to maintain a consistent data set.

The central session management server validates the session credentials of client users. This system architecture allows a single sign-on and shared use of the session credentials. However, a central session management server is a potential single point for managing and controlling all sessions in the system and is therefore vulnerable as a single point of failure. A central session management server can also limit network performance for session updates. As a network scales, there are more applications in the single sign-on environment and more traffic to and from the session manager. Therefore, in addition to being a single point of failure, this type of architecture with a central session management server can impose additional network traffic loads. The additional network traffic loads can have a significant effect when session management is distributed over a wide area network, where bandwidth tends to be more restricted than over a local area network.

One of the reasons that systems use a central session management server is to provide a central location to check for session invalidity. This requires a check for credential invalidity each time a client accesses a server application. However, session invalidity is a very rare event. Therefore, checking for credential validity creates a significant volume of overhead to detect a rare event.

What is needed is a system and method that provides single session sign-on without requiring a central session management server, without providing a single point of failure, or without the associated network traffic load.

The preceding description is not to be construed as an admission that any of the description is prior art relative to the present invention.

SUMMARY OF THE INVENTION

In one embodiment, the invention provides a method and system for single sign-on session management by establishing a session credential, validating the session credential at a first server, granting access to a first protected resource of the first server, validating the session credential at a second server, and granting access to a second protected resource of the second server. In this embodiment, communication with a third server is not required to validate the session credential at either the first server or the second server.

In one embodiment, the invention provides a method and system for single sign-on session management by providing a list of authorized users to a first server and to a second server, establishing a session credential using the list of authorized users, validating the session credential at the first server, validating the session credential at a second server, providing an update to the list of authorized users to the first server and to the second server, and changing the session credential based on the update to the list. Communication with a third server is not required to validate the session credential at either the first server or the second server.

In one embodiment, the invention provides a system for single sign-on session management comprising a first server with a first resource, a session management plug-in running on the first server, a second server with a second resource, a session management plug-in running on the second server, a first network providing a connection of the second server to the first server, and a client with a session credential, the client connectable to the first server and to the second server by the first network. The first server validates the session credential using the session management plug-in running on the first server without requiring a connection to either the second server or any other server and the second server validates the session credential using the session management plug-in running on the second server without requiring a connection to either the first server or any other server.

The foregoing specific aspects of the invention are illustrative of those which can be achieved by the present invention and are not intended to be exhaustive or limiting of the possible aspects or advantages that can be realized. Thus, the aspects of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

Figure 1:
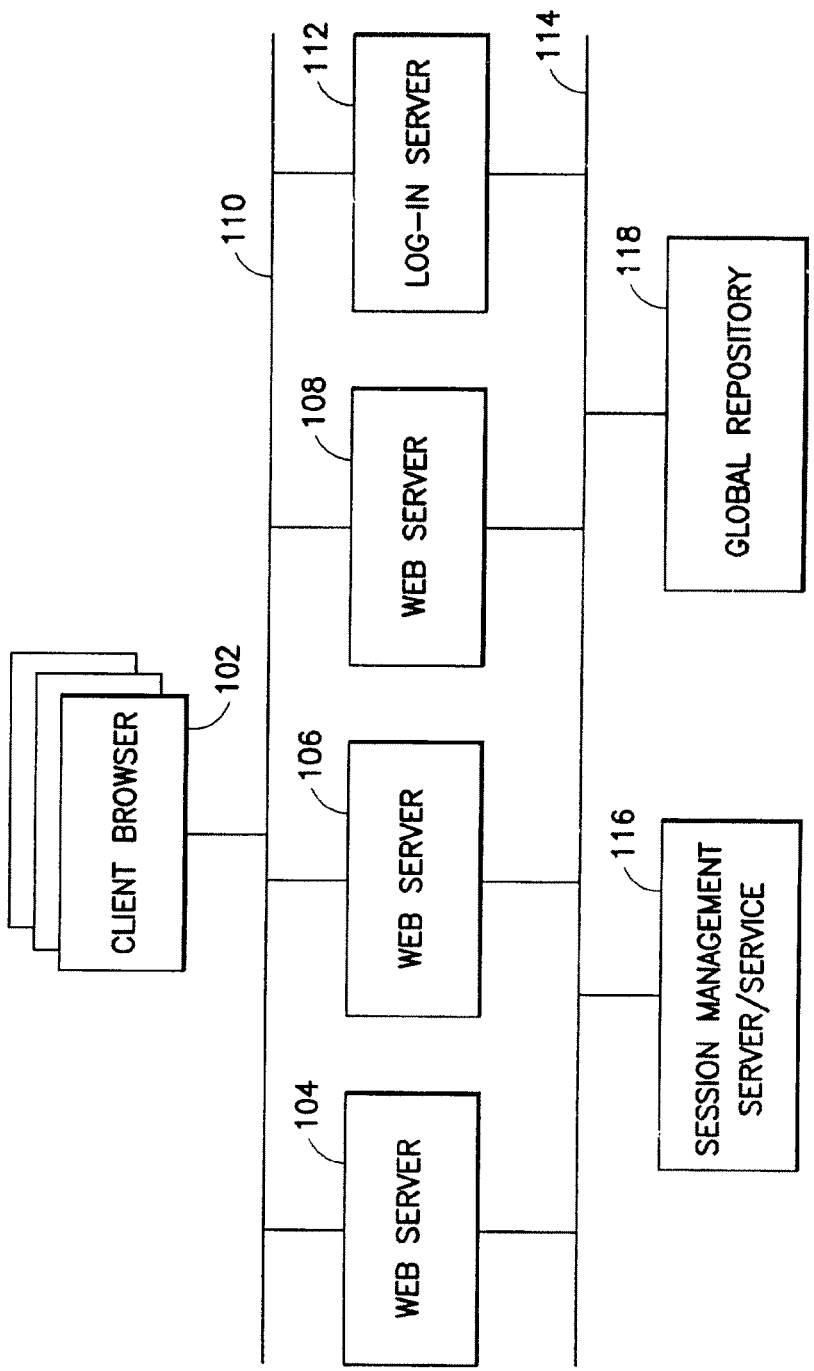
FIG. 1 illustrates a prior art system.

In order to understand the various embodiments of the methods and systems of the instant invention, it is helpful to understand existing systems and methods. Referring to FIG. 1, client users 102 running browser applications on their computers are connected to various servers 104, 106, 108 by a network 110, which can be the Internet over a wired or wireless transport. Also connected to network 110 is a log-in server 112. Network 110 is typically a public network or intranet. Connecting servers 104, 106, 108, 112 is another network 114, which is typically a private network, not directly available to client users 102. Alternatively network 114 is part of network 110. Networks 110, 114 typically provide or require appropriate security protection, and they may be local area networks (LAN), wide area networks (WAN) or a combination of both. Network 114 provides an interconnection between servers 104, 106, 108, log-in server 112, session management server 116 and global repository 118.

Figures 2, 2A:
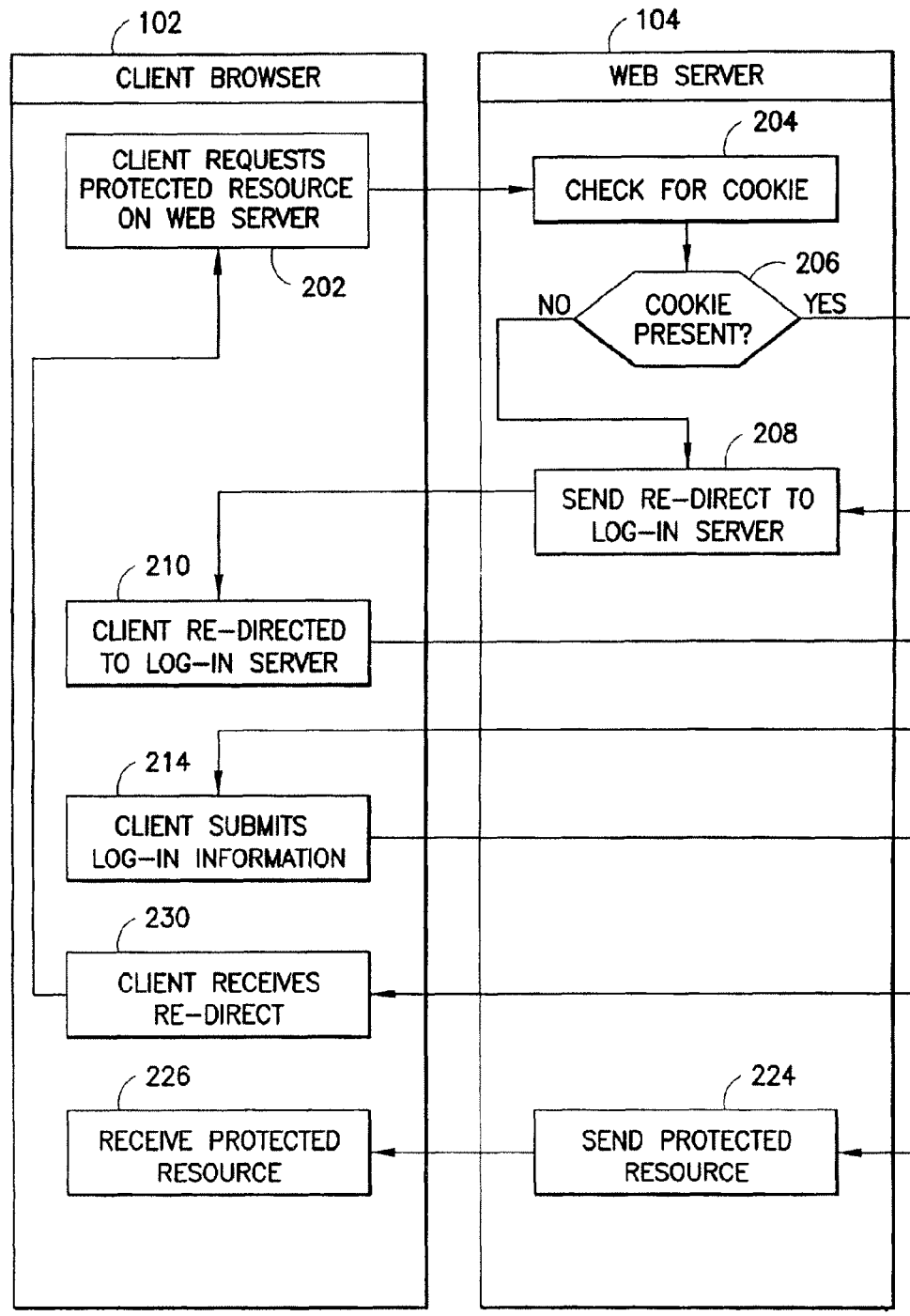
FIG. 2 illustrates a prior art method.
Figure 2B:
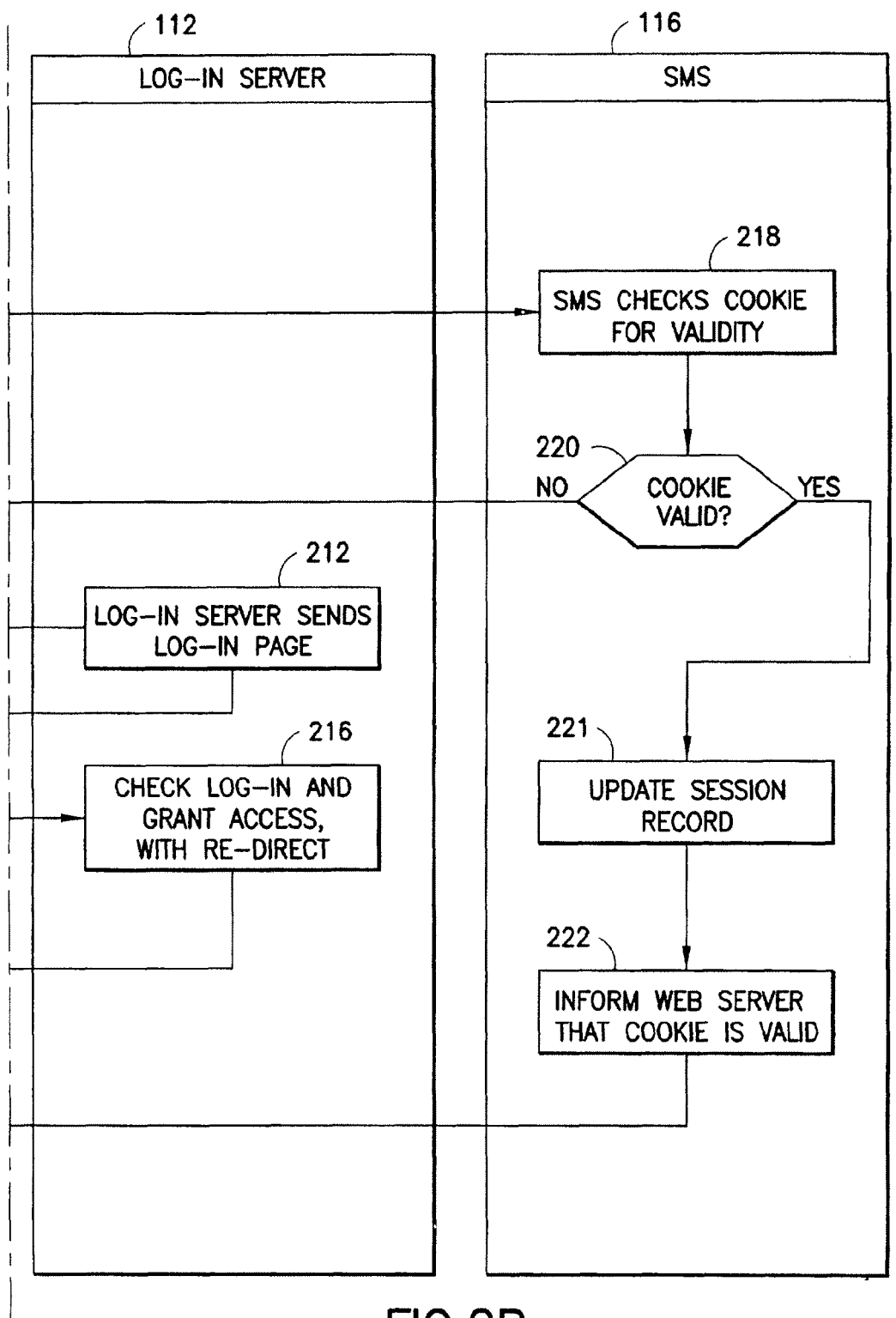

Referring to FIGS. 1 and 2, at step 202, a client user 102 with a browser application running on their computer requests a protected resource on server 104.

At steps 204, 206, server 104 checks to see if the request includes a cookie or token.

If there is no cookie present, then at steps 208, 210, client 102 is redirected to log-in server 112.

At steps 212, 214, log-in server 112 sends a log-in page to client 102 and client 102 provides log-in information.

At step 216, log-in server 112 checks the log-in information provided by the client user against a master list and grants access by issuing a credential to the user if the log-in information for the client user is correct. Although not illustrated, if the log-in information is not correct the client may be given other opportunities to provide the correct log-in information before possibly being locked out of the system.

The credential that log-in server 112 grants to the user is typically in the faun of a token or cookie that is sent to the client browser application. Once the client user 102 has received the credential in the form of the cookie, every time they want access to a protected resource on server 104, the client user sends that cookie with the request to server 104.

On the re-direct at step 230, now that the client user has received a credential at step 216, the browser is redirected back to server 104. However, this time, when server 104 checks for a cookie at steps 204, 206, (the cookie containing the client credential) the cookie is found and the cookie or part of the cookie is sent to session management server 116 (SMS) to check for validity.

It is understood that some companies use the term SMS to refer to proprietary systems or services. However, here the term SMS refers generically to a session management server, without limit to any particular brand or company.

At steps 218, 220, SMS 116 checks for validity of the credential contained within the cookie. If the credential information is valid, then at step 221, SMS 116 updates the session record of client user 102 and then at step 222, SMS 116 informs server 104, which sends the protected resource to client user 102 at step 224. Client user 102 receives the requested protected resource at step 226.

It is possible that a cookie is present with the initial request for a protected resource, as determined at steps 204, 206, but the credential information is either not valid or is not correct, as determined at steps 218, 220. In this case, at step 208, client user 102 is redirected to log-in server 112, where the previously described log-in steps 210 through 216 are performed.

There are a number of reasons that credential information contained within the cookie may be invalid, such as expiration of a session time-out value or activity time-out value.

Figure 3:
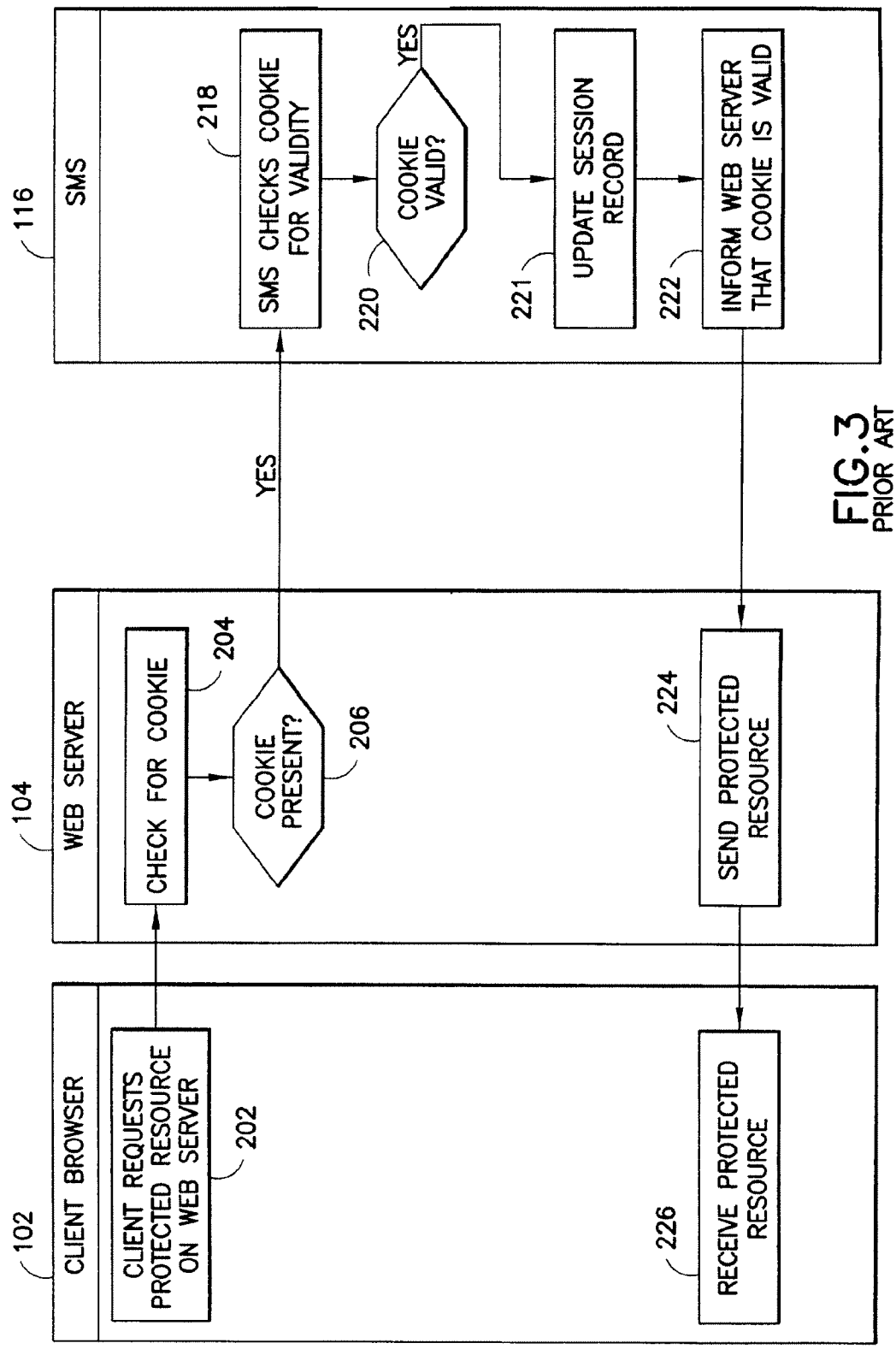
FIG. 3 illustrates a prior art method.

To simplify somewhat, FIG. 3, illustrates only some of the steps that are included in FIG. 2. Referring now to FIGS. 1 and 3, it is clear that even after client user 102 has successfully logged in, for every request of a protected resource on server 104, there is first a check for a cookie at steps 204, 206, and then the cookie, or information from the cookie is sent over network 114 to SMS 116, which validates the credential information at steps 218, 220 before updating the session record of client user 102 at step 221 and informing server 104, at step 222 that the credentials are valid, and server 104 provides the protected resource at steps 224, 226. Validation of the credentials thereby occurs before server 104 sends the protected resource to client user 102 at step 226. In one embodiment, the instant invention avoids the need for communication between server 104 and SMS 116 over network 114, while allowing maintenance of session state information.

Figure 4:
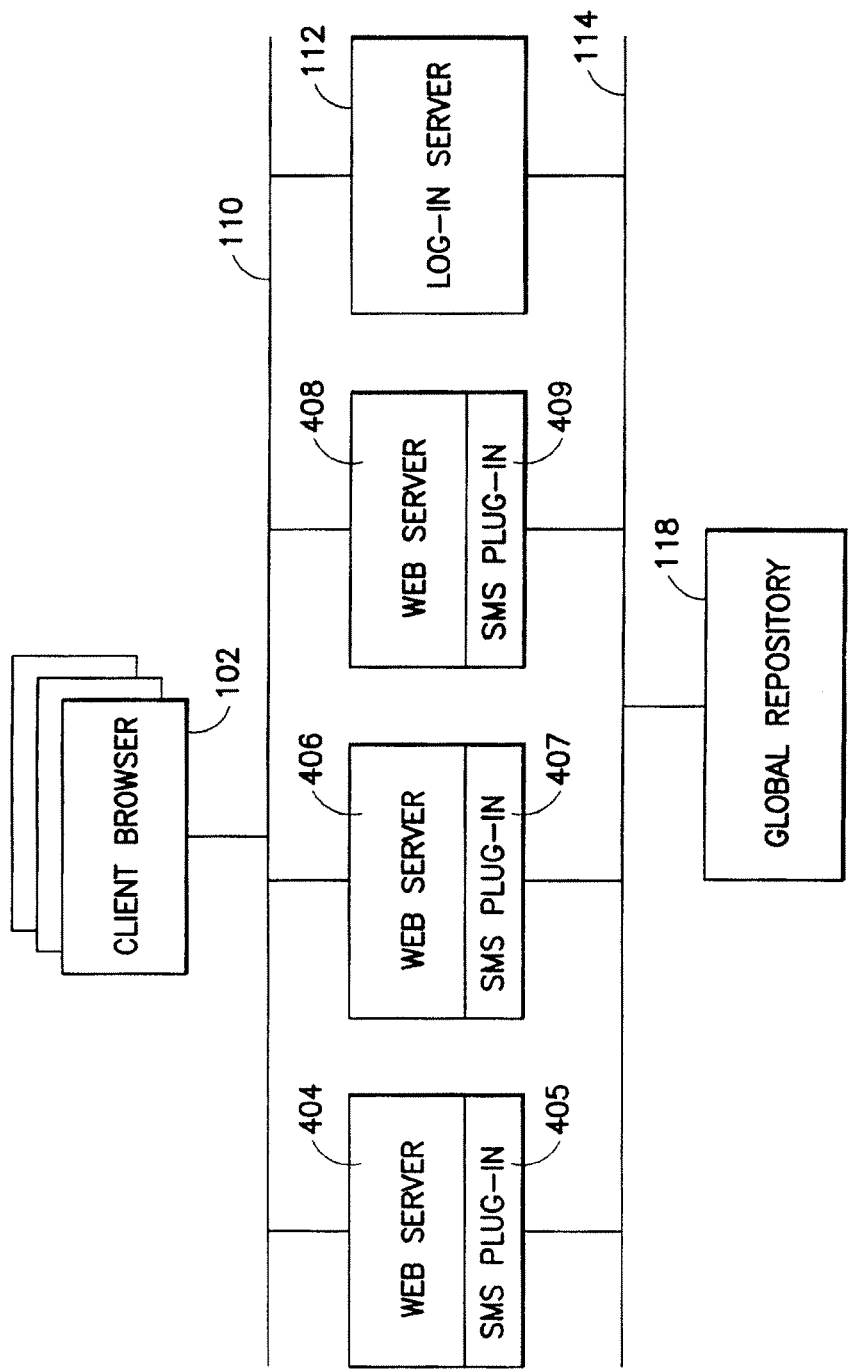
FIG. 4 illustrates an embodiment of a system according to the invention.

Referring now to FIG. 4, one embodiment of the invention is illustrated. Client user 102, with a browser application on their computer, is connected to servers 404, 406, 408 and log-in server 112 by network 110. Servers 404, 406, 408 and log-in server 112 are inter-connected with global repository 118 by network 114.

Servers 404, 406, 408 each run a respective instance of a session management service (SMS) plug-in 405, 407, 409.

Figure 5B:
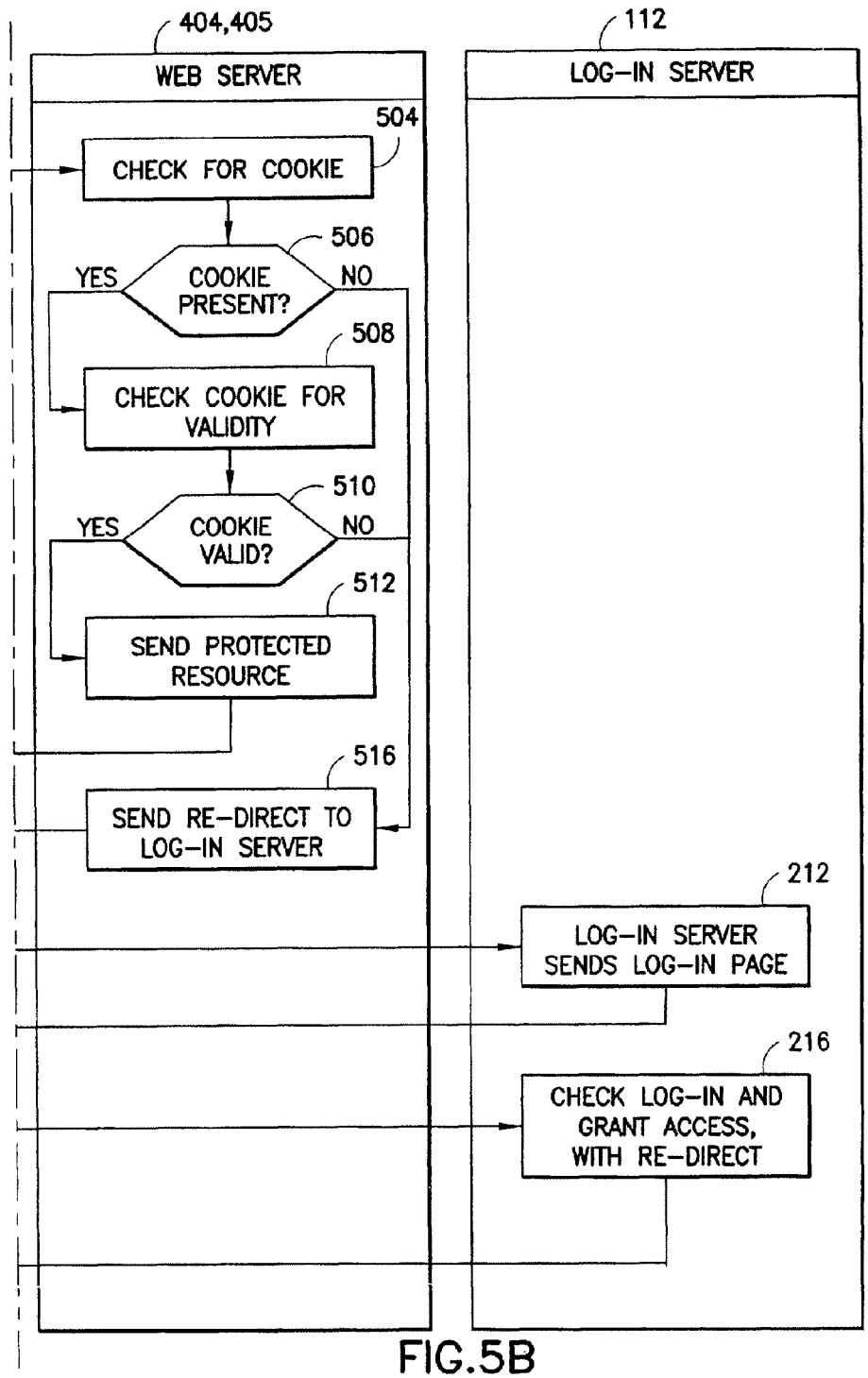
FIG. 5 illustrates an embodiment of a method according to the invention.

Referring to FIGS. 4 and 5, in one embodiment, at step 502, client user 102 requests a protected resource on server 404.

At steps 504, 506, server 404 checks for a cookie in the request.

If a cookie is present in the request, then at steps 508, 510, server 404 checks to see if the cookie is valid, and if valid, at steps 512, 514 server 404 sends the protected resource that was requested by client user 102.

If server 404 determines at steps 504, 506 that a cookie is not present with the request, or at steps 508, 510 that the cookie is not valid, then at steps 516, 518 the client user is re-directed to log-in server 112.

The log-in process illustrated at steps 212 through 216 of FIG. 5 is the same or similar to the similarly numbered steps that are illustrated in FIG. 2.

Figure 6:
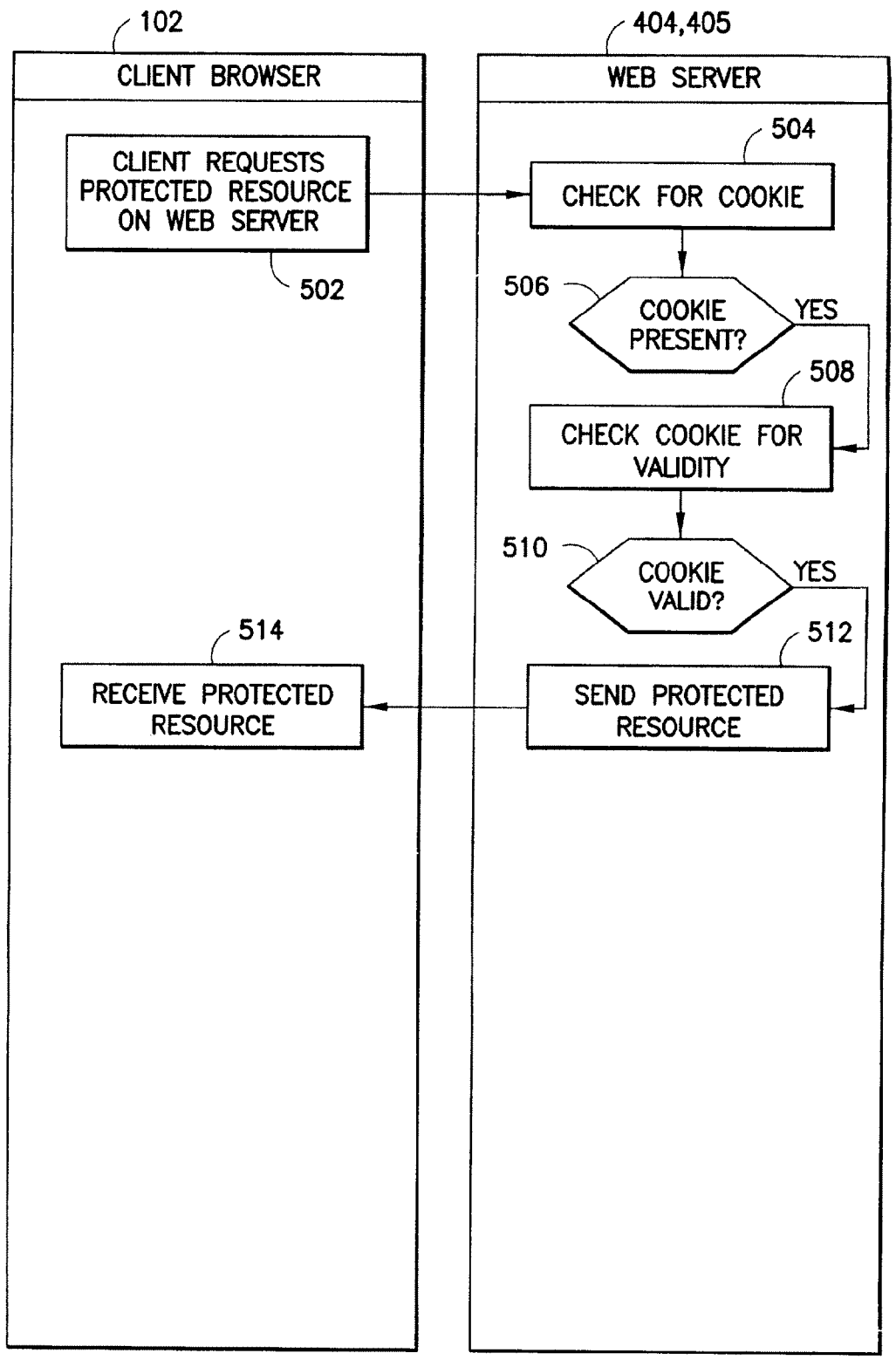
FIG. 6 illustrates an embodiment of a method according to the invention.

To simplify somewhat, FIG. 6 illustrates only some of the steps that are included in FIG. 5. Referring now to FIGS. 4 and 6 it is clear that after client user 102 has successfully logged in, for every request of a protected resource on server 404, the server first checks for a cookie at steps 504, 506, and then the server validates the cookie, or credential information from the cookie at steps 508, 510. Validation of the client user session credentials thereby occurs entirely within server 404 and SMS plug-in 405, and avoids the need for communication between server 404 and any other server. In this manner once a credential is granted and held, client user 102 will continue to be able to access protected resources on server 404. This is because the credential validation process does not rely on a separate session management server. Instead, session management is handled by SMS plug-in 405 within server 404.

Using a cryptographically generated cookie, such as described elsewhere, once credentialed by server 404, client 102 will also be able to access protected resources on the other servers (406, 408).

In the embodiments of the invention that are illustrated in FIGS. 4-6, log-in server 112 is separate and distinct from servers 404, 406, 408. As a distinct server, if the connection over networks 110, 114 to log-in server 112 is lost, or becomes unreliable, it will be difficult or impossible for new users to gain access to the protected resources of servers 404, 406, 408 because they will not be able to establish or get credentials. Similarly, if log-in server 112 goes down or becomes unreliable, new client users will be unable to gain access by establishing session credentials.

Figure 7:
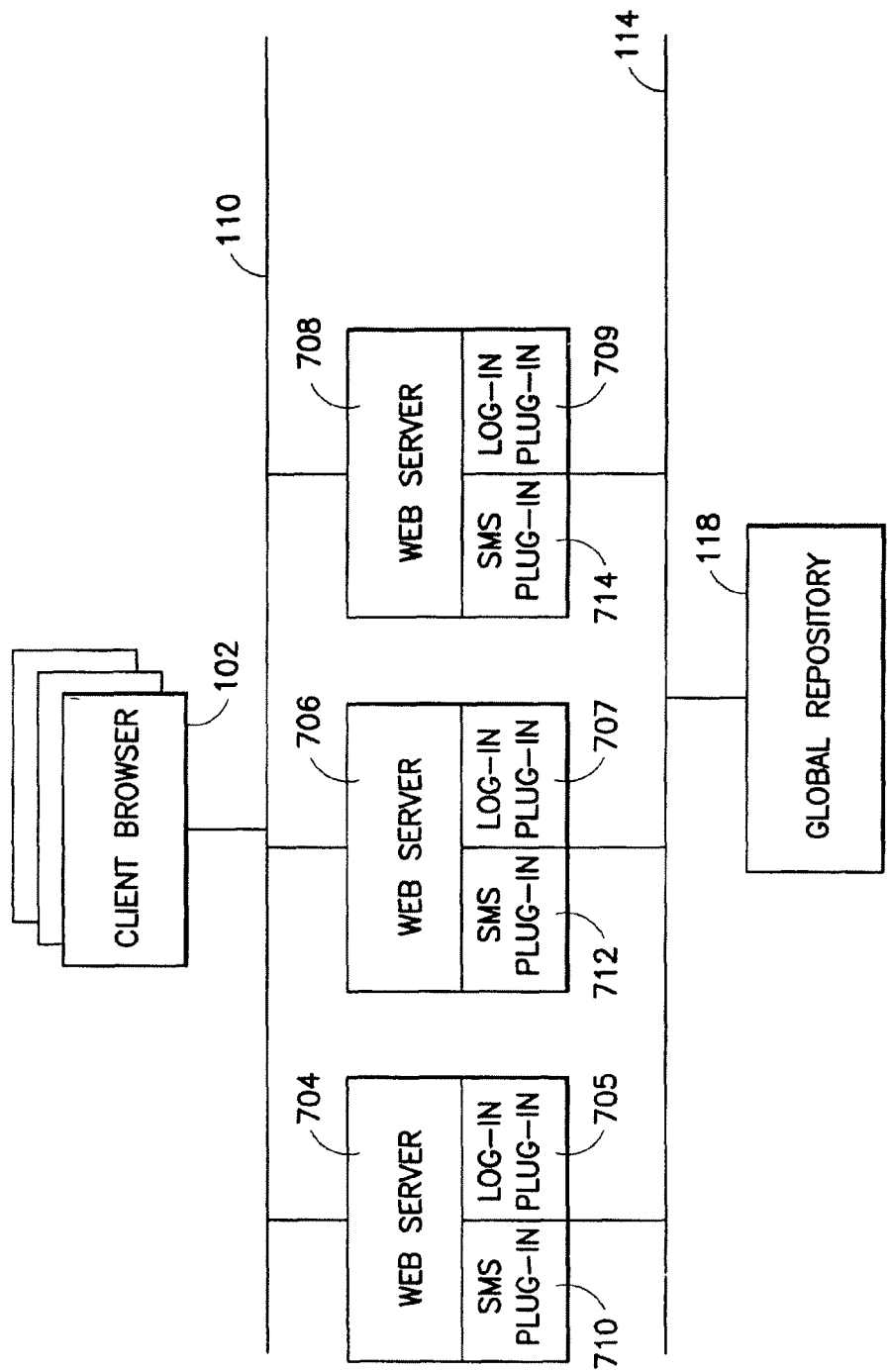
FIG. 7 illustrates an embodiment of a system according to the invention.

FIG. 7 illustrates an embodiment of the invention to address log-in. As illustrated in the embodiment of the invention in FIG. 7, log-in functions are replicated within each of servers 704, 706, 708. These log-in functions are handled as plug-ins 705, 707, 709 within respective servers 704, 706, 708. However, some form of synchronization is still necessary to ensure that the list of authorized users and accesses is maintained and available at each server 704, 706, 708 and respective log-in plug-in (705, 707, 709). To accomplish this synchronization, global repository 118 is connected to servers 704, 706, 708 by network 114. Although not illustrated, it is also possible that instead of a connection using separate network 114, global repository 118 is connected to servers 704, 706, 708 by network 110.

Figure 8:
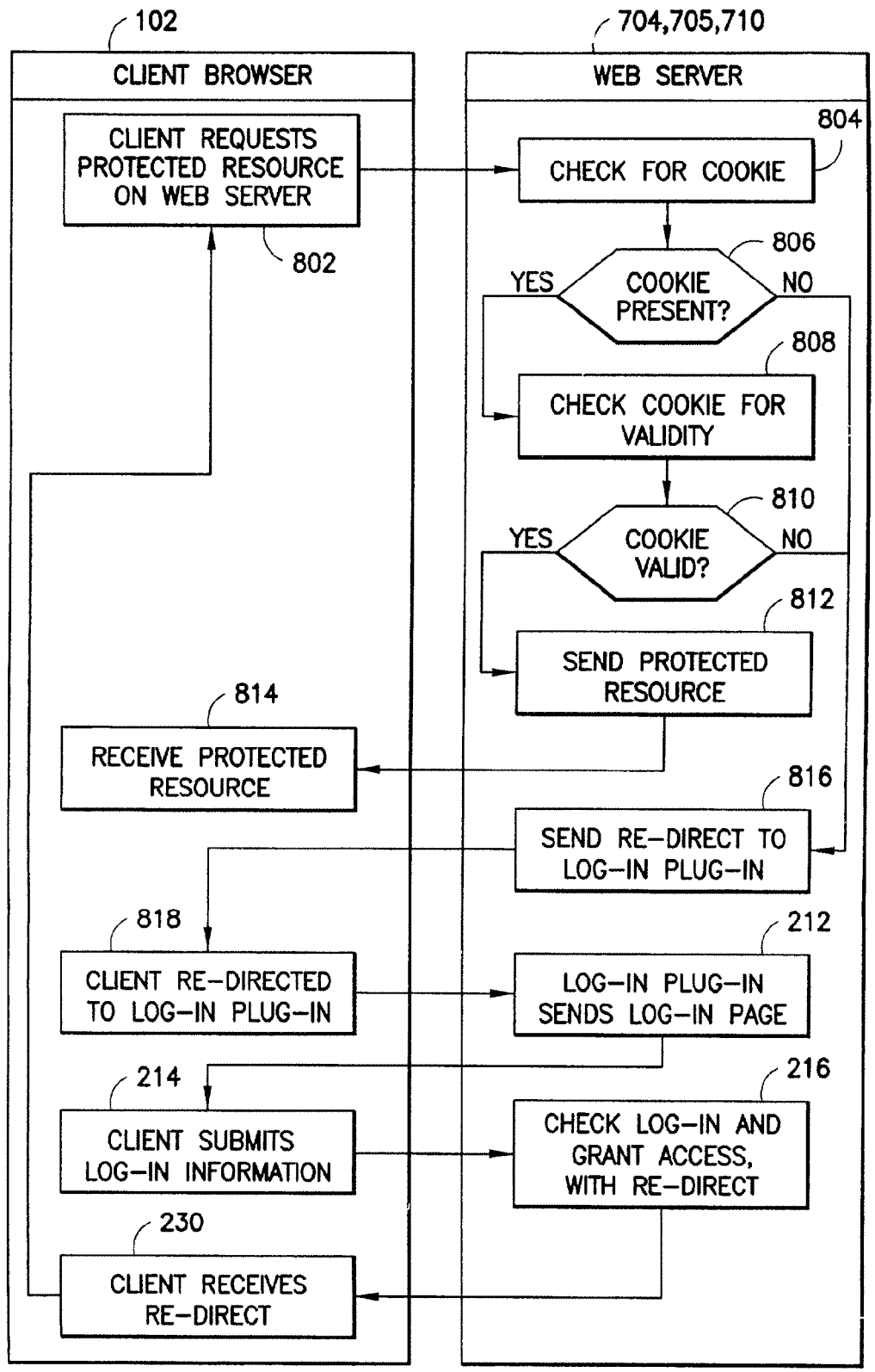
FIG. 8 illustrates an embodiment of a method according to the invention.

Referring now to FIGS. 7 and 8, in one embodiment, at step 802, client user 102 requests a protected resource on server 704.

At steps 804, 806, server 704 checks for a cookie in the request.

If a cookie is present in the request, then at steps 808, 810, the session management plug-in 710 of server 704 checks to see if the cookie is valid, and if valid, at steps 812, 814 server 704 sends the protected resource that was requested by client user 102.

If server 704 or session management plug-in 710 determines at steps 804, 806 that a cookie is not present with the request, or at steps 808, 810 that the cookie is not valid, then at steps 816, 818 the client user is re-directed to log-in plug-in 705.

It is also possible, although not illustrated, that log-in plug-in 705 and server 704 merely sends the log-in page at step 212, bypassing redirection steps 816 and 818.

The log-in process illustrated at steps 212 through 216 of FIG. 8 is the same or similar to the steps that are illustrated in FIG. 2, however the functions are performed by log-in plug-in 705, rather than by log-in server 112.

As illustrated and described, it is clear that client user 102 can successfully log-in at any of servers 704, 706, 708. This has the benefit of eliminating the need for a separate log-in server and also eliminates the need for a separate session management server to validate each client request for a protected resource. Instead, log-in and validation of the client user session credentials occurs entirely within server 704, 706, 708 using respective plug-ins and avoids the need for communication between servers 704, 706, 708 and any other server. In this manner, client user 102 can log-in and access protected resources on any of servers 704, 706, 708. This is because neither the log-in nor the credential validation process relies on a separate session management server or a separate log-in server. Instead, log-in and session management is replicated by plug-ins and handled within each of servers 704, 706, 708. Further, if a cryptographically generated cookie is available, such as described elsewhere, the session credentials from log-in to one server are valid and useable on any of the other servers.

Figure 9A:
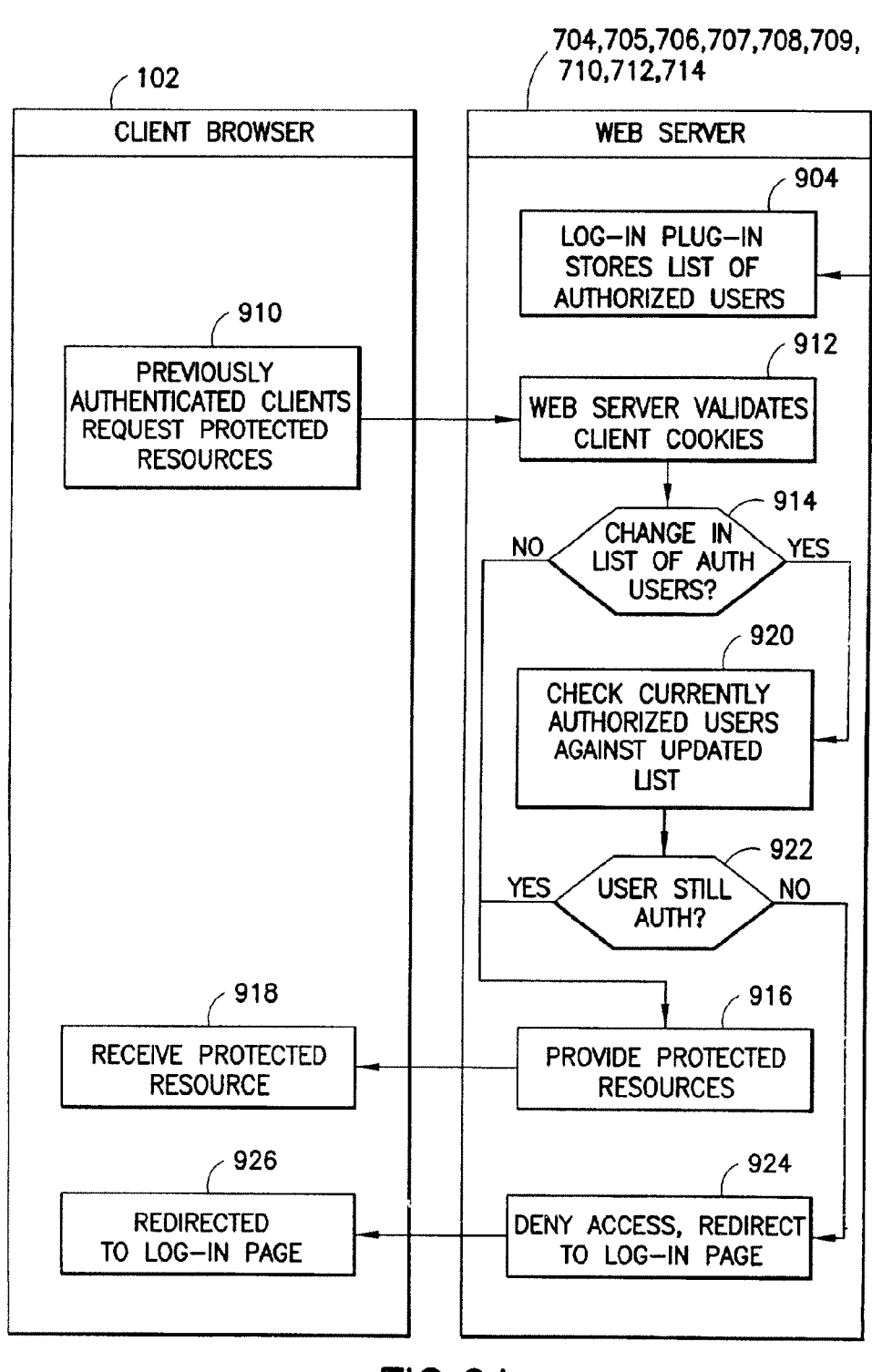
FIG. 9 illustrates an embodiment of a method according to the invention.

FIGS. 7 and 9 illustrate an embodiment of the invention and a technique to synchronize authorized client user information and modify or revoke credentials of a client user.

At steps 902, 904, global repository 118 sends a list of authorized client users and authorized accesses to each of log-in plug-ins 705, 707, 709. This may be a push of the information, or log-in plug-ins 705, 707, 709 may individually request the information from repository 118 on a regular basis. Log-in plug-ins 705, 707, 709 use this list of authorized client users and their respective access to create a session credential for any authorized client user 102 that attempts to gain access to a protected resource on any of servers 704, 706, 708. Once the log-in plug-in creates the session credential, client user 102 uses the credential in their requests for protected resources from any of servers 704, 706, 708. This is possible as long as the credential remains valid.

During either regular updates, or on an ad hoc basis, at step 906, repository 118 determines whether there is a change in the authorized users. The change can be addition or deletion of users, addition or deletion of particular accesses of users or changes to user entitlements. If there is no change in the authorized users, repository loops or does nothing. However, if there is a change in the authorized users, then at step 908, repository 118 pushes the update of the list of authorized users out to each of log-in plug-ins 705, 707, 709. To ensure that the most current information on authorized users is available to every log-in plug-in, this update is normally a push operation from repository 118, rather than a scheduled pull by log-in plug-ins 705, 707, 709.

In steps that are not illustrated in FIG. 9, client user 102 is authenticated and gets a session credential. Then, at step 910, the previously authenticated client user 102 requests access to a protected resource on server 704. At step 912, before granting access to the requested resource, session management plug-in 710 validates the session credentials of client user 102.

Assuming the client credentials are valid, then at step 914, server 704, or log-in plug-in 705 determines whether there has been a change in the list of authorized users. For example, a change in the list of authorized users could occur when repository 118 pushes an update to the list at step 908 and the log-in plug-in stores the update at step 904.

If there has been no change in the list of authorized users, then at steps 916, 918, server 704 provides the protected resource to client user 102.

However, if there has been a change in the list of authorized users, then at steps 920, 922 the client user is checked against the updated list to determine if the user remains authorized, or whether their current accesses must be changed.

If the particular client user was not affected by the update to the list, then at steps 916, 918 the requested protected resource is provided.

However, if the particular client user is no longer authorized, or their access has been changed for that particular resource, then at steps 924, 926 the access is denied and the client user is directed to the log-in page of the log-in plug-in 705. Alternatively, although not illustrated, the client user may be denied access to that particular protected resource, but allowed access to other protected resources.

An Example of Cryptographically Generated Cookies

Where session management is moved from a single or central server to individual plug-ins running on the individual servers, it is advantageous for credentials granted by one server to be useable by another server. Otherwise, the credentials do not truly provide single session sign-on. Therefore, a technique for creating and using cryptographically generating cookies is provided.

An example of a cryptographically generated cookie is provided below.

| 1 (4 bytes) | 2 (4 bytes) | 3 (8 bytes) | 4 (8 bytes) | 5 (8 bytes) | 6 (20 bytes) |
| --- | --- | --- | --- | --- | --- |

The layout of the data in the cookie is as follows:

1. Version, a 32-bit signed integer, network byte order
2. User ID, a 32-bit signed integer, network byte order. This field contains the user ID from the Global Repository
3. Last Activity, a 64-bit signed integer, network byte order. This field contains the time of last activity in milliseconds and in GMT, per the Java Date Implementation.
4. Session Start timestamp, a 64-bit signed integer, network byte order. This field contains the time at which the session started in milliseconds and in GMT, per the Java Date Implementation.
5. Maximum Session Idle Time, a 64 bit signed integer, network byte order. This field contains the maximum session idle time during the current session in milliseconds. The value will only increase in value during a session. One purpose of this field is to allow different idle time restrictions for different applications. For example if the current session was idle for 6 minutes on an application where the idle time restriction is 10 minutes, this field will reflect that 6 minutes of idle time. However, the session will not be terminated. If the user then attempts to connect to a different application, which has a maximum idle time restriction of 5 minutes, the user will not be allowed access because the maximum session idle time during the current session (6 minutes) is longer than the idle time restriction of the application (5 minutes).
6. Message Authenticator, a 160-bit HMAC. This field contains an SHA-1 HMAC of fields 1-5, computed using a key which is shared amongst the runtimes.

The entire credential is Base64-encoded into text format when it is placed in the client browser.

Using a cookie of this format, every time that client user 102 requests a protected resource from a server, the SMS plug-in of the server first checks for and decrypts the cookie, and then checks for validity of the cookie. Each of the SMS plug-ins can perform these checks because the key is shared by all of the servers.

Figure 10:
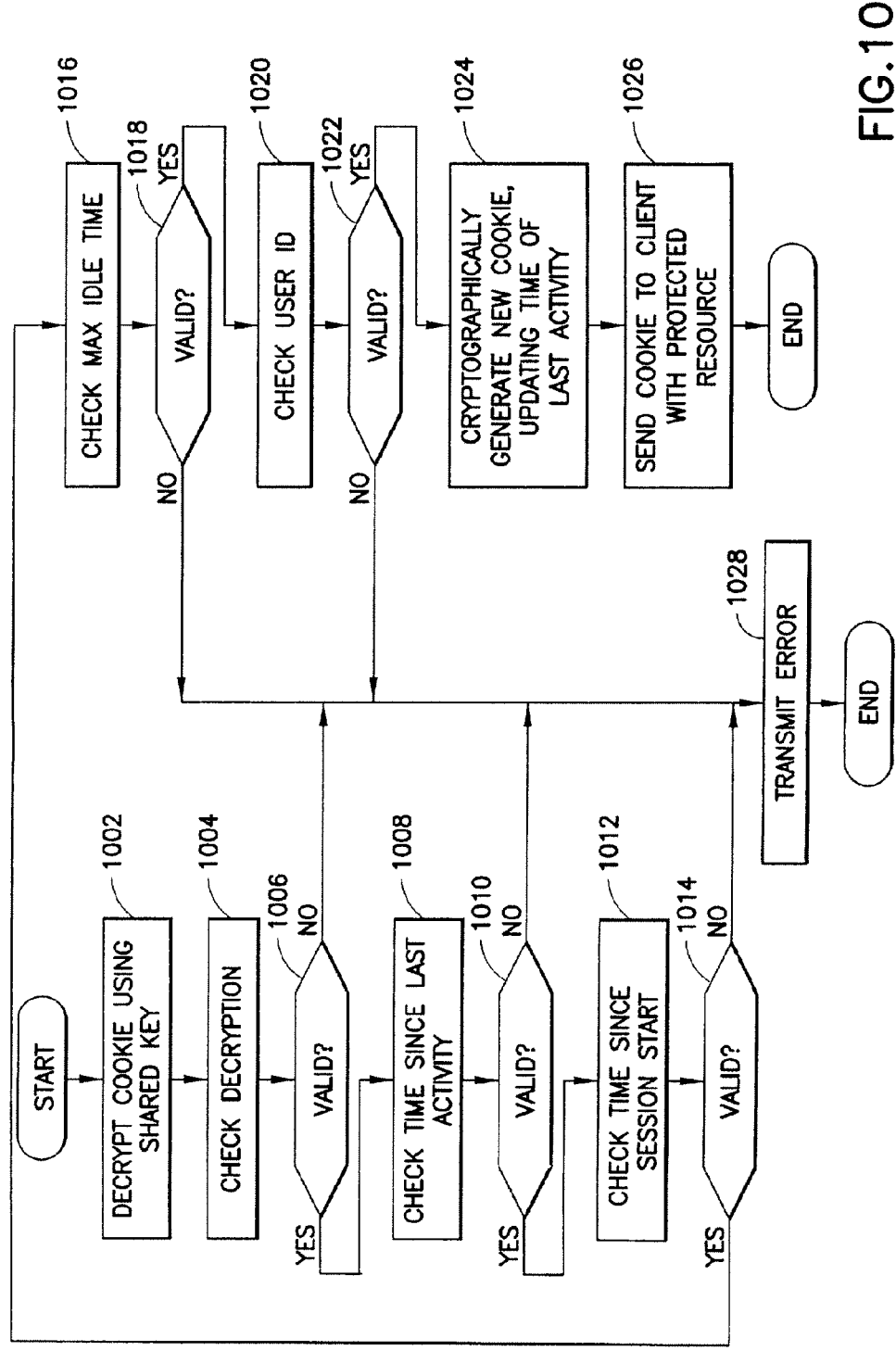
FIG. 10 illustrates an embodiment of a method according to the invention.

Referring now to FIG. 10, a method of an embodiment using a cryptographic cookie begins at step 1002, when the SMS plug-in of the server decrypts the cookie using the shared key.

At steps 1004, 1006 the SMS plug-in checks decryption validity. If the decryption is not valid, the plug-in generates an error message at step 1028 and ends.

If the decryption is valid, then at steps 1008, 1010, the SMS plug-in checks the time since last activity. If the time has exceeded a pre-set time, the plug-in generates an error message at step 1028 and ends.

If the time since last activity is valid, then at steps 1012, 1014, the SMS plug-in checks the time since session start. If the time has exceeded a pre-set time, the plug-in generates an error message at step 1028 and ends.

If the time since session start is valid, then at steps 1016, 1018, the server checks the maximum idle time value. If the maximum idle time exceeds the idle time restriction of the current application, the plug-in generates an error message at step 1028 and ends.

If the maximum idle time value is valid, then at steps 1020, 1022, the server checks the user ID. The server may perform this check, or it may be performed by the log-in plug-in running on the server. If the user ID is not valid, the server or plug-in generates an error message at step 1028 and ends or loops for further action, such as through any of the known techniques.

If the user ID is valid, then at step 1024, a new cryptographically generated cookie is created, updating the time of last activity. At step 1026, the new cookie is sent to the client with the protected resource.

It is possible that some of the checks illustrated in FIG. 10 are not performed at all, or that other checks are performed.

Although illustrative embodiments have been described herein in detail, it should be noted and will be appreciated by those skilled in the art that numerous variations may be made within the scope of this invention without departing from the principle of this invention and without sacrificing its chief advantages.

One such variation is the use of credentials to personalize content even though the requested resource may not be protected. In this way, the visual presentation or content is personalized according to the user.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A computer-implemented method for single sign-on session management from a user browser over a network, the method comprising:

receiving, by each of a first server and a second server, a list of authorized users from a global repository;

establishing a session credential using computer processing components at the first server, the first server having a first log-in plug-in and a first session management plug-in;

validating the session credential at the first session management plug-in of the first server, the first session management plug-in establishing and validating the session credential based on the list of authorized users previously received from the global repository;

granting access to the user browser to a first resource of the first server based on validation of the session credential at the first session management plug-in of the first server;

receiving a request from the user browser for a second resource at the second server, the second server including a second log-in plug-in and a second session management plug-in, the request including the session credential established at the first server;

checking for the validity of the session credential established at the first server at the second session management plug-in of the second server upon determining that the session credential is present, wherein the second session management plug-in checks for and verifies the validity of the session credential entirely within the second server without communicating with other servers in real time;

when the session credential is not valid, then establishing a new session credential at the second server using the second log-in plug-in based on the list of authorized users previously received from the global repository and validating the new session credential at the second session management plug-in of the second server; and granting access to the second resource of the second server based on the validation at the second session management plug-in of the second server, wherein the first log-in plug-in and the second log-in plug-in are each configured to authenticate the user browser independently without redirecting it to a central sign-on server.

2. A method according to claim 1, further comprising updating a time value within the session credential at the first server.

3. A method according to claim 2, wherein the time value is a session timeout value.

4. A method according to claim 2, wherein the time value is a maximum idle time value.

5. A method according to claim 1, further comprising updating a time value within the session credential in conjunction with granting access to the resource of the first server.

6. A method according to claim 1, further comprising:
checking for presence of a session credential at the first server; and
if the session credential is not present, then establishing the session credential.

7. A method according to claim 1, further comprising creating a session credential at a third server.

8. A method according to claim 1, wherein the session credential is contained within a token that is received by the user browser.

9. A method according to claim 8, wherein the token is a cryptographically generated cookie that can be decrypted with a decryption key shared between the first server and the second server.

10. A method according to claim 8, wherein the token is held by the user browser.

11. A method according to claim 1, wherein the validation of the session credential entirely within the first server comprises decrypting a cryptographically generated cookie.

12. A method according to claim 1, wherein the first resource is a protected resource.

13. The method of claim 1, wherein each server has access to updated authorized user information.

14. A method according to claim 13, further comprising changing, at the first server and the second server, the session credential based on the update to authorized user information.

15. A method according to claim 14, wherein changing the session credential includes revoking access to one or more resources held by the first server.

16. A method according to claim 14, wherein changing the session credential includes adding access to one or more resources held by the first server.

17. A method according to claim 1, wherein validating the session credential at the first server comprises validating the session credential entirely within the first server by decrypting a cryptographically generated cookie.

18. A method of claim 1, wherein each server receives an update to the list of authorized users from the global repository.

19. The method of claim 18, further comprising establishing the session credential using the list of authorized users.

20. A computer-implemented method for single sign-on session management from a user browser over a network, the method comprising:
receiving, by each of a first server and a second server, a list of authorized users from a global repository;
establishing a session credential using computer processing components at the first server, the first server having a first log-in plug-in and a first session management plug-in;
granting access to the user browser to a first resource of the first server based on validation of the session credential at the session management plug-in of the first server, the first session management plug-in establishing and validating the session credential based on the list of authorized users previously received from the global repository;
transmitting from the first server to the user browser a cryptographically generated cookie containing the session credential;
receiving a request from the user browser for a second resource at the second server, the second server including a second log-in plug-in and a second session management plug-in, the request including the cryptographically generated cookie with the session credential established at the first server;
decrypting, at the second server, the cryptographically generated cookie with a decryption key shared between the first server and the second server;
validating, at the second session management plug-in of the second server, the session credential decrypted from the cryptographically generated cookie, wherein the validity of the session credential is verified entirely within the second server without communicating with other servers in real time;
when the session credential is validated, granting access to the second resource of the second server based on the validation of the session credential; and
when the session credential is not validated, attempting to establish a new session credential at the second server using the second log-in plug-in based on the list of authorized users previously received from the global repository,
wherein the first log-in plug-in and the second log-in plug-in are each configured to authenticate the user browser independently without redirecting it to a central sign-on server.

* * * * *